US009564794B2

(12) United States Patent
Ku et al.

(10) Patent No.: US 9,564,794 B2
(45) Date of Patent: Feb. 7, 2017

(54) SYSTEM, APPARATUS, AND METHOD FOR A PING-PONG CHARGE PUMP (71) Applicant: Broadcom Corporation, Irvine, CA (US)

(72) Inventors: I-Ning Ku, Los Angeles, CA (US); Hui Zheng, Irvine, CA (US); Jungwoo Song, Irvine, CA (US); Xicheng Jiang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 182 days.

(21) Appl. No.: 14/139,257

(22) Filed: Dec. 23, 2013

(65) Prior Publication Data
US 2015/0155771 A1    Jun. 4, 2015

Related U.S. Application Data (60) Provisional application No. 61/911,815, filed on Dec. 4, 2013.

(51) Int. Cl.
H02M 3/07      (2006.01)
H02M 1/14      (2006.01)
(52) U.S. Cl.
CPC .............. *H02M 1/14* (2013.01); *H02M 3/07* (2013.01); *H02M 2003/077* (2013.01)
(58) Field of Classification Search
CPC .............. H02M 3/07; H02M 2003/072; H02M 2003/077
See application file for complete search history.

(56) References Cited

U.S. PATENT DOCUMENTS 5,936,459 A  *  8/1999  Hamamoto ................. 327/536
5,969,988 A  *  10/1999  Tanzawa et al. ........ 365/185.23
(Continued)

FOREIGN PATENT DOCUMENTS

EP    2665171 A1    11/2013
GB    2455524 A     6/2009
(Continued)

OTHER PUBLICATIONS

Search Report received for European Patent Application No. 14004098.1, mailed on Jun. 25, 2015, 3 pages.
(Continued)

Primary Examiner — Thomas J Hiltunen
(74) Attorney, Agent, or Firm — Fiala & Weaver P.L.L.C.

(57) ABSTRACT

Systems, apparatuses, and methods provided for ping-pong charge pumps. Flying capacitors present in ping-pong charge pumps are operated out of phase to increase equalization periods. Out-of-phase operation also decreases voltage differences between flying capacitors during equalization periods thus decreasing ping-pong charge pump output voltage ripple and snapback. The voltages of the flying capacitors may be equalized without the use of an equalization switch. Differential control currents that are based on the voltage difference between the flying capacitors are used to enable or disable the flying capacitors from driving an output load of the ping-pong charge pump during certain phases of operation. A capacitor with a lower voltage may be disabled, thus providing for voltage equalization as the enabled capacitor sources current to the output load. The flying capacitors are also equalized during overlapping time periods in which the flying capacitors are charging.

20 Claims, 8 Drawing Sheets (56) References Cited

U.S. PATENT DOCUMENTS

| | | | | |
|---|---|---|---|---|
| 6,512,411 | B2* | 1/2003 | Meng | H02M 3/07 307/110 |
| 6,859,091 | B1* | 2/2005 | Nicholson et al. | 327/536 |
| 7,190,598 | B1* | 3/2007 | Alenin | 363/60 |
| 7,948,301 | B2* | 5/2011 | Cook et al. | 327/536 |
| 7,990,742 | B2* | 8/2011 | Lesso | H02M 3/07 363/60 |
| 8,013,664 | B2* | 9/2011 | Gerber | H02M 3/07 327/536 |
| 8,198,869 | B2* | 6/2012 | Yang et al. | 320/166 |
| 8,363,856 | B2* | 1/2013 | Lesso | H02M 3/07 381/120 |
| 8,476,962 | B2* | 7/2013 | Pelley | 327/536 |
| 8,497,605 | B2* | 7/2013 | Kundur Subramaniyan et al. | 307/151 |
| 8,508,288 | B2* | 8/2013 | MacFarlane | 327/536 |
| 8,710,911 | B2* | 4/2014 | Chien | G05F 3/02 327/536 |
| 8,742,835 | B2* | 6/2014 | Lin et al. | 327/536 |
| 8,829,979 | B2* | 9/2014 | Galal | H02M 3/07 327/536 |
| 8,860,498 | B2* | 10/2014 | Schatzberger | H02M 3/07 327/536 |
| 8,994,452 | B2* | 3/2015 | Kim | H02M 3/07 330/257 |
| 2003/0090252 | A1 | 5/2003 | Hazucha | |
| 2006/0119390 | A1* | 6/2006 | Sutardja | G06F 1/26 326/62 |
| 2008/0054990 | A1 | 3/2008 | Shieh et al. | |
| 2010/0013445 | A1* | 1/2010 | Martinussen | 323/234 |
| 2011/0050326 | A1 | 3/2011 | Cook et al. | |
| 2011/0204961 | A1 | 8/2011 | Galal et al. | |
| 2011/0278952 | A1* | 11/2011 | Reimann | H02M 3/07 307/109 |
| 2013/0162337 | A1 | 6/2013 | Chien | |
| 2013/0249506 | A1 | 9/2013 | Lin | |
| 2014/0266124 | A1* | 9/2014 | Wang | 323/288 |
| 2015/0311784 | A1* | 10/2015 | Saadat | H02M 3/07 327/536 |

FOREIGN PATENT DOCUMENTS

| WO | 2008/027038 A1 | 3/2008 |
| WO | 2013/101718 A1 | 7/2013 |

OTHER PUBLICATIONS

Communication Pursuant to Article 94(3) EPC received for European Patent Application No. 14004098.1, mailed on Jul. 17, 2015, 6 pages.

Communication Pursuant to Article 94(3) EPC received for European Patent Application No. 14004098.1, mailed on Apr. 29, 2016, 6 pages.

* cited by examiner

SYSTEM, APPARATUS, AND METHOD FOR A PING-PONG CHARGE PUMP

CROSS-REFERENCE TO RELATED APPLICATIONS

This application claims priority to U.S. Provisional Patent Application No. 61/911,815, filed Dec. 4, 2013, and entitled "System, Apparatus, and Method for a Ping-Pong Charge Pump," the entirety of which is incorporated by reference herein.

BACKGROUND

1. Technical Field

The subject matter described herein relates to systems, apparatuses, and methods for ping-pong charge pumps.

2. Background Art

Internet technologies, such as cable modems and digital subscriber line ("DSL") modems, often utilize charge pumps to drive signals on output lines. A charge pump is a voltage source that utilizes one or more capacitors to store charge. One type of charge pump used is a "ping-pong" charge pump. A conventional implementation of a ping-pong charge pump includes two flying capacitors that are coupled together by an equalization switch. The flying capacitors alternate (or "ping-pong") between regulating an output voltage to drive output signals and charging, such that when one flying capacitor is regulating, the other flying capacitor is charging. In conventional implementations, the brief period of time when the flying capacitors alternate between regulating and charging is used for equalization of capacitor charges using an equalization switch.

Figure 1:
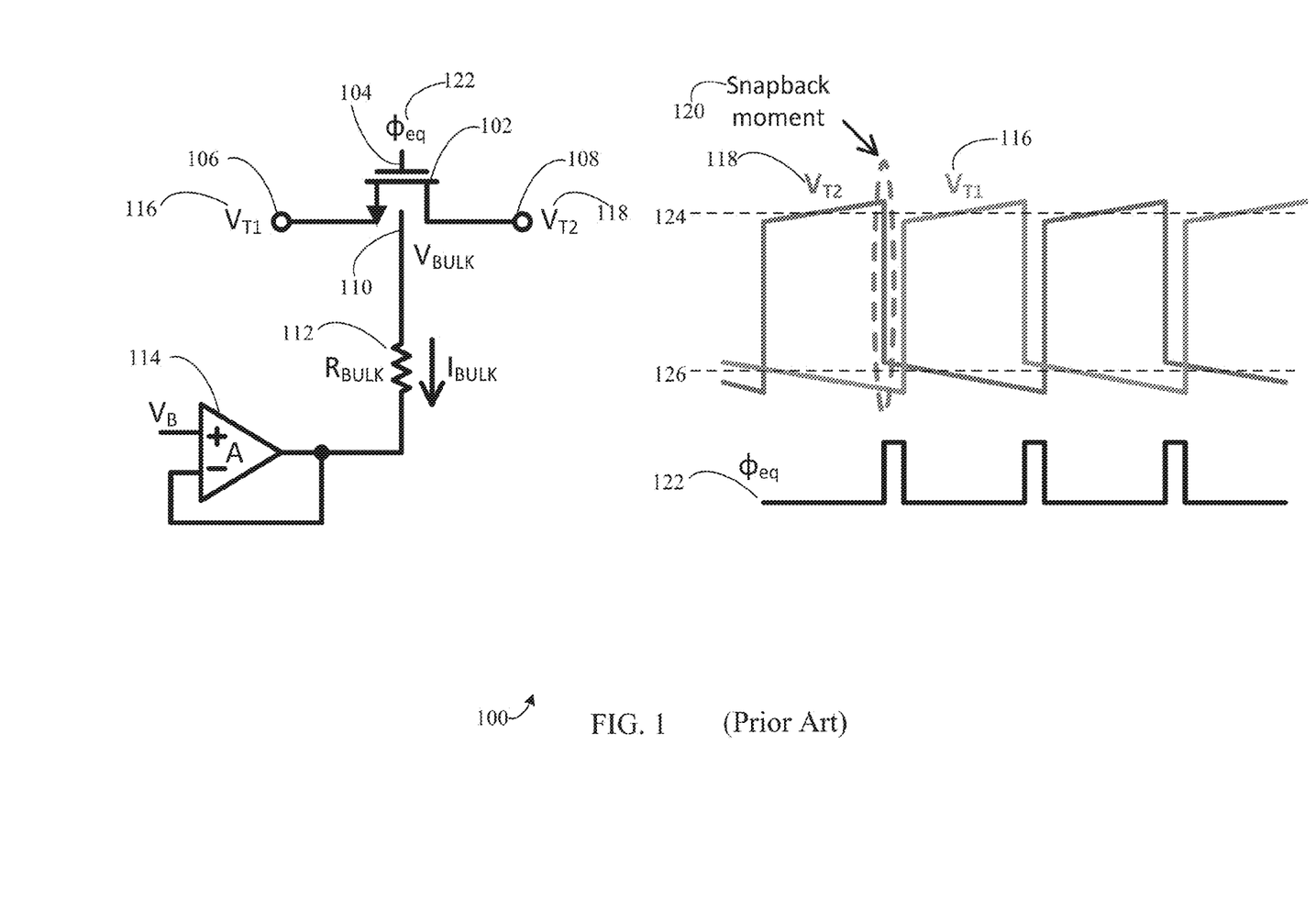
FIG. 1 is a circuit and voltage level diagram of a prior art equalization switch solution for a ping-pong charge pump.

A prior art representation of an equalization switch solution 100 is shown in FIG. 1. Equalization switch 102, typically a transistor such as the NMOS transistor shown in FIG. 1, is used to connect the top plates of the two flying capacitors during a brief equalization phase. A gate terminal 104 of equalization switch 102 is connected to an equalization clock signal $\phi_{eq}$ 122. A source terminal 106 of equalization switch 102 is connected to the top plate of a first capacitor having a voltage $V_{T1}$ 116, and a drain terminal 108 of equalization switch 102 is connected to the top plate of a second capacitor having a voltage $V_{T2}$ 118. A bulk terminal 110 of equalization switch 102 is biased to a voltage $V_{BULK}$ by a bias voltage source 114 (e.g., a unity gain buffer, as shown). Because a parasitic resistance 112 ($R_{BULK}$) is present in routing metal wire, an extremely large bulk voltage $V_{BULK}$ may be induced by the bulk current ($I_{BULK}$) during the operation of equalization switch 102 due to the voltage difference between $V_{T1}$ 116 and voltage $V_{T2}$ 118.

For instance, when equalization switch 102 is open (e.g., as shown when equalization clock signal $\phi_{eq}$ 122 remains low), the capacitors of the ping-pong charge pump are not connected, and each capacitor either charges (e.g., at level 124) or regulates (e.g., at level 126) the output voltage of the ping-pong charge pump. However, when equalization switch 102 is closed (e.g., as shown when equalization clock signal $\phi_q$ 122 transitions from low to high) the capacitors are directly connected through equalization switch 102, and their voltages $V_{T1}$ 116 and $V_{T2}$ 118 are equalized. When the difference in voltages $V_{T1}$ 116 and $V_{T2}$ 118 of the two flying capacitors is large at the time of closing equalization switch 102, snapback may occur. Snapback is a state in which high bulk current (parasitic current $I_{BULK}$, as shown) flows through equalization switch 102 (e.g., due to parasitic resistance 112 ($R_{BULK}$)) and can result in damage to and/or breakdown of the ping-pong charge pump. A snapback moment 120 is illustrated in FIG. 1 where the voltage difference between $V_{T1}$ 116 and $V_{T2}$ 118 is large. It should be noted, however, that even small voltage differences can cause a snapback state that may damage a ping-pong charge pump due to the bulk current $I_{BULK}$ and the parasitic resistance inherent in the routing metal wire (e.g., parasitic resistance 112 ($R_{BULK}$) of routing metal wire).

Furthermore, conventional ping-pong charge pumps implement equalization switch solution 100, as shown, and require a large implementation area due to the equalization switch requirement.

Additionally, conventional ping-pong charge pumps are susceptible to voltage output ripple, a variance in the output voltage level of the ping-pong charge pump. High output ripple is often due to inconsistent voltages (i.e., voltage differences) between the flying capacitors caused by inadequate equalization times. For instance, as noted above, the brief equalization time (e.g., as shown when equalization clock signal $\phi_{eq}$ 122 transitions from low to high) available when the capacitors alternate between charging (e.g., at level 124) and regulating (e.g., at level 126) states is insufficient to prevent voltage output ripple.

BRIEF SUMMARY

Systems, apparatuses, and methods are described for ping-pong charge pumps, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. The left-most digit(s) of a reference number identifies the drawing in which the reference number first appears.

DETAILED DESCRIPTION

1. Introduction

The present specification discloses numerous example embodiments. The scope of the present patent application is not limited to the disclosed embodiments, but also encompasses combinations of disclosed embodiments, as well as modifications to disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, terminology used herein such as "about," "approximately," and "substantially" have equivalent meanings and may be used interchangeably.

Still further, it should be noted that the drawings/figures are not drawn to scale unless otherwise noted herein.

Still further, the terms "coupled" and "connected" may be used synonymously herein, and may refer to physical, operative, electrical, communicative and/or other connections between components described herein, as would be understood by a person of skill in the relevant art(s) having the benefit of this disclosure.

Numerous exemplary embodiments are now described. Any section/subsection headings provided herein are not intended to be limiting. Embodiments are described throughout this document, and any type of embodiment may be included under any section/subsection. Furthermore, disclosed embodiments may be combined with each other in any manner.

2. Example Embodiments

The examples described herein may be adapted to various types of data transmission devices, computing systems, communications systems, communication devices, electronic devices, and/or the like, which include charge pumps and ping-pong charge pumps. The described embodiments refer to ping-pong charge pumps, although the inventive techniques provided herein may be applicable to other types of charge pumps. Furthermore, additional structural and operational embodiments, including modifications/alterations, will become apparent to persons skilled in the relevant art(s) from the teachings herein.

In embodiments, ping-pong charge pumps may include two or more flying capacitors configured to drive an output load. The flying capacitors may operate at two voltage levels. When a flying capacitor is sourcing current to drive an output load of the ping-pong charge pump, a first voltage level may be present at the flying capacitor. When a flying capacitor is charging, a second voltage level may be present at the flying capacitor. The ping-pong charge pumps described herein may iteratively operate through a plurality of sequential phases in which two or more flying capacitors alternate between being charged (i.e., charging) and driving an output load (i.e., regulating an output voltage). As referred to herein, a time period in which a flying capacitor is charging may be a "charging phase," and a time period in which a flying capacitor is regulating an output voltage may be a "regulating phase."

To reduce and/or eliminate unwanted output voltage characteristics, such as output voltage ripple, the flying capacitors in a ping-pong charge pump may be equalized during one or more equalization periods. Equalizing the voltages between the flying capacitors allows for a smooth, consistent voltage output from the ping-pong charge pump. In embodiments, the operation of ping-pong charge pumps in accordance with the phases described herein allow for equalization periods of sufficient length to reduce and/or eliminate output voltage ripple. For instance, the operational phases of a first flying capacitor may be shifted in time (i.e., out of phase) with the operational phases of a second flying capacitor. In embodiments, the operation of the first flying capacitor may be 90° out of phase, or approximately 90° out of phase, with the operation of the second flying capacitor, although other phase alignments are contemplated in the embodiments herein. The resulting shift in time of the operational phases extends equalization periods over those allowed for in conventional solutions.

The embodiments described herein also include ping-pong charge pump configurations that reduce and/or eliminate snapback states that plague conventional charge pumps that use equalization switches to equalize voltages between flying capacitors. In some embodiments, a current provider circuit provides differential control currents to switches associated with respective flying capacitors that enable the capacitors to, or disable the capacitors from, driving output loads. For instance, if one flying capacitor holds less charge than another, the capacitor with less charge may be prevented (or disabled) from driving an output load by opening its associated switch using a differential control current. As the voltage of the other flying capacitor is used to drive the output load, the voltages of the two flying capacitors become equalized, the switch associated with the disabled capacitor is closed, and both flying capacitors may then be utilized in driving the output load or may be charged. Thus equalization is accomplished without using an equalization switch, and snapback states are reduced and/or eliminated.

As shown and described herein, switches may comprise proprietary switch circuits and various forms and/or implementations of transistors, such as bipolar junction transistors ("BJTs"), field effect transistors ("FETs"), metal-oxide semiconductor FETs ("MOSFETs"), and/or the like. Additionally, FETs and MOSFETs may be nMOS transistors and/or pMOS transistors in different embodiments, as would be understood by persons of skill in the relevant art(s) having the benefit of this disclosure.

The techniques and embodiments described herein provide for such improvements in voltage regulation and operation of ping-pong charge pumps as described above.

For instance, methods, systems, and apparatuses are provided for ping-pong charge pumps. In an example aspect, a method is disclosed. The method includes operating a ping-pong charge pump using a plurality of operational phases. The method also includes charging a first capacitor of the ping-pong charge pump and a second capacitor of the ping-pong charge pump during a first phase of the plurality of operational phases. The method further includes regulating an output voltage of the ping-pong charge pump using the first capacitor and the second capacitor during a second phase of the plurality of operational phases. The method further includes equalizing a charge of the first capacitor and a charge of the second capacitor during at least one of the first phase or the second phase.

In another example aspect, a method for equalizing a ping-pong charge pump is disclosed. The method includes sensing a first voltage at a first capacitor. The method further includes sensing a second voltage at a second capacitor. The method further includes providing a differential control current to disable the first capacitor from driving an output of the ping-pong charge pump based on the first voltage being less than the second voltage.

In yet another example aspect, a ping-pong charge pump is disclosed that includes a first capacitor, a second capacitor, and a current provider circuit. The first capacitor is configured to source a first driving current to an output load. The second capacitor is configured to source a second driving current to the output load. The current provider circuit is electrically coupled to the first capacitor and to the second capacitor. The current provider circuit is configured to provide at least one of a first differential control current to disable the sourcing of the first capacitor or a second differential control current to disable the sourcing of the second capacitor. The first and second differential control currents are based at least on a difference between a voltage of the first capacitor and a voltage of the second capacitor.

Various example embodiments are described in the following subsections. In particular, example ping-pong charge pump embodiments are described, followed by example embodiments for phases and voltage levels. This is followed by a description of further example ping-pong charge pump advantages and embodiments. Next, example operational embodiments are described. Finally, some concluding remarks are provided.

3. Example Ping-Pong Charge Pump Embodiments

Figure 2:
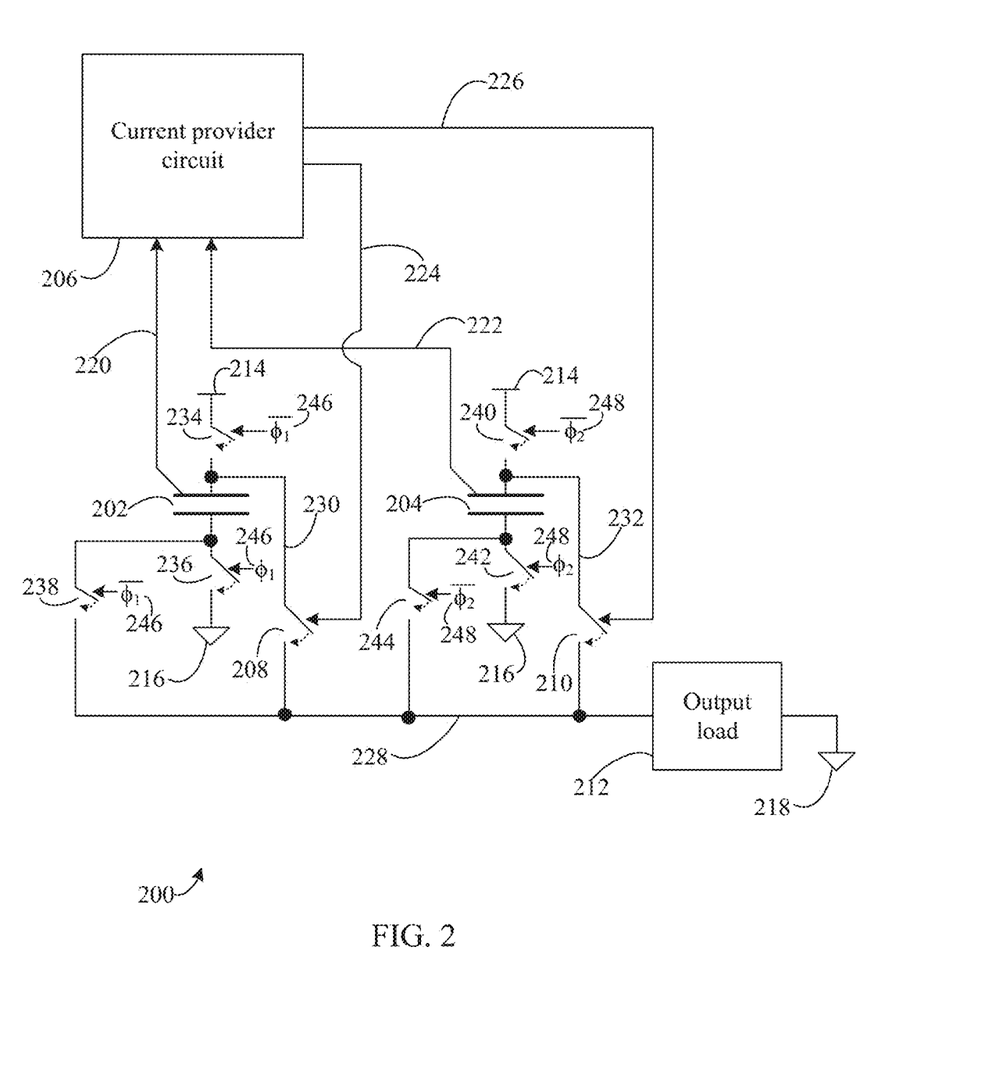
FIG. 2 is a circuit diagram of a portion of a ping-pong charge pump, according to an exemplary embodiment.

A charge pump, e.g., a ping-pong charge pump, may be configured in various ways to drive an output load, in embodiments. For example, FIG. 2 shows a circuit diagram of a ping-pong charge pump 200, according to an embodiment. Ping-pong charge pump 200, as illustrated, includes a first flying capacitor 202 (hereinafter, "first capacitor"), a second flying capacitor 204 (hereinafter, "second capacitor"), a current provider circuit 206, a first switch 208, a second switch 210, and an output load 212. Ping-pong charge pump 200 may also include a first clock switch 234, a second clock switch 236, a third clock switch 238, a fourth clock switch 240, a fifth clock switch 242, and a sixth clock switch 244, each of which may be implemented as any type of switch or transistor, as described herein. Ping-pong charge pump 200 and each of the components included therein may include functionality and connectivity beyond what is shown in FIG. 2, as would be apparent to persons skilled in relevant art(s). However, such additional functionality is not shown in FIG. 2 for the sake of brevity. Additionally, it should be noted that embodiments of ping-pong charge pump 200 may exclude output load 212 shown in FIG. 2 for illustrative purposes.

First capacitor 202 may have its top plate connected to a voltage source 214 (e.g., a system VDD or charge pump VDD voltage source) via first clock switch 234 and to first switch 208 via a connection 230, and have its bottom plate connected to a charge pump ground 216 via second clock switch 236 and to connection 228 via third clock switch 238. Second capacitor 204 may have its top plate connected to voltage source 214 (e.g., a system VDD or charge pump VDD voltage source) via fourth clock switch 240 and to second switch 210 via a connection 232, and have its bottom plate connected to charge pump ground 216 via fifth clock switch 242 and to connection 228 via sixth clock switch 244. In embodiments, second clock switch 236 may be controlled using a control signal or a clock signal such as $\phi_1$ 246; first clock switch 234 and third clock switch 238 may be controlled using an inverted instance of the control signal or the clock signal that controls second clock switch 236, such as $\overline{\phi_1}$ 246. In embodiments, fifth clock switch 242 may be controlled using a control signal or a clock signal such as $\phi_2$ 248; fourth clock switch 240 and sixth clock switch 244 may be controlled using an inverted instance of the control signal or the clock signal that controls second clock switch 236, such as $\overline{\phi_2}$ 248. The source of the control signals and/or clock signals $\phi_1$ 246 and $\phi_2$ 248 (not shown) may be any known or future control signal or clock signal. Additionally, the application of these control signals and clock signals is discussed in further detail below with respect to FIGS. 3 and 4. For example, first clock switch 234, second clock switch 236, third clock switch 238, fourth clock switch 240, fifth clock switch 242, and sixth clock switch 244 described above may close (activate) and open (deactivate) according to the cycle of a clock signal, in embodiments, and commensurate with the description of ping-pong charge pump 200 described below.

First capacitor 202 may drive output load 212 (connected to a load ground 218) through first switch 208 (when activated) via a regulation voltage connection 228, and second capacitor 204 may drive output load 212 through second switch 210 (when activated) via regulation voltage connection 228, as shown. The voltage present at the top plate of first capacitor 202 may be monitored or sensed by current provider circuit 206 via a connection 220, and the voltage present at the top plate of second capacitor 204 may be monitored or sensed by current provider circuit 206 via a connection 222. Current provider circuit 206 may provide a differential control current to first switch 208 via a connection 224, and may provide a differential control current to second switch 210 via a connection 226.

First capacitor 202 is configured to drive output load 212. In embodiments, first capacitor 202 may source current to drive output load 212 through first switch 208 when first switch 208 is activated (i.e., closed). First capacitor 202 is also configured to store charge (i.e., to be charged) from voltage source 214.

Second capacitor 204 is configured to drive output load 212. In embodiments, second capacitor 204 may source current to drive output load 212 through second switch 210 when second switch 210 is activated (i.e., closed). Second capacitor 204 is also configured to store charge (i.e., to be charged) from voltage source 214.

As noted above, current provider circuit 206 may provide a differential control current to first switch 208 via a connection 224, and may provide a differential control current to second switch 210 via a connection 226. In an embodiment, current provider circuit is configured to provide a first differential control current to first switch 208 via connection 224 and to provide a second differential control current to second switch 210 via connection 226. Current provider circuit 206 is configured to monitor or sense the voltage present at first capacitor 202 and to monitor or sense the voltage present at second capacitor 204. Current provider circuit 206 may provide the first differential control current and the second differential control current based on the difference between the voltage present at first capacitor 202 and the voltage present at second capacitor 204. Accordingly, current provider circuit 206 is configured to control the equalization of voltages present at first capacitor 202 and second capacitor 204.

For example, if the voltage present at first capacitor 202 is less than the voltage present at second capacitor 204, current provider circuit 206 may provide a first differential control current to first switch 208 via connection 224 to open first switch 208 and prevent (i.e., disable) first capacitor 202 from driving output load 212. Current provider circuit 206 may also provide a second differential control current to second switch 210 via connection 226 to close second switch 210 and allow (i.e., enable) second capacitor 202 to drive output load 212. As second capacitor 204 drives output load 212 and sources current to output load 212, the voltage present at second capacitor 204 decreases. Current provider circuit 206 is configured to monitor and/or sense the voltage present at second capacitor 204 as it drives output load 212, and when the voltage present at second capacitor 204 is equal to (or approximately equal to) the voltage present at first capacitor 202, current provider circuit 206 is configured to provide another differential control current to first switch 208 causing first switch 208 to close and allow (i.e., enable) first capacitor 202 to drive output load 212 (along with second capacitor 204, in embodiments). In this way, the voltages of first capacitor 202 and second capacitor 204 may be equalized without an equalization switch, such as equalization switch 102 of FIG. 1.

In embodiments, the differential control current that is applied to open first switch 208 and disable first capacitor 202 may cease to be applied by current provider circuit 206. In some embodiments, ceasing to provide the differential control current to disable first capacitor 202 may include providing another and/or a different differential control current to first switch 208.

In the embodiments described herein, one or more differential control currents may be provided by a sensing circuit and/or a current source, as described in further detail below with respect to FIG. 3. Furthermore, as described below with respect to FIG. 3, ping-pong charge pump 200 may include a first current mirror associated with first capacitor 202 and first switch 208, and may include a second current mirror associated with second capacitor 204 and second switch 210. The first and second current mirrors may receive differential control currents, in addition to or in lieu of, first switch 208 and second switch 210 to enable and/or disable first capacitor 202 and second capacitor 204.

It should be noted that while first capacitor 202 is described as being disabled from driving output load 212 in the example described above, in embodiments when the voltage present at second capacitor 204 is less than the voltage present at first capacitor 202, second capacitor 202 may be disabled from driving output load 212 by providing a differential control current from current provider circuit 206 to second switch 210 via connection 226. In other words, each of first capacitor 202 and second capacitor 204 may be disabled from driving output load 212 depending on the monitored and/or sensed voltages of the respective capacitors as described above.

Additional configurations for ping-pong charge pumps are also contemplated.

Figure 3:
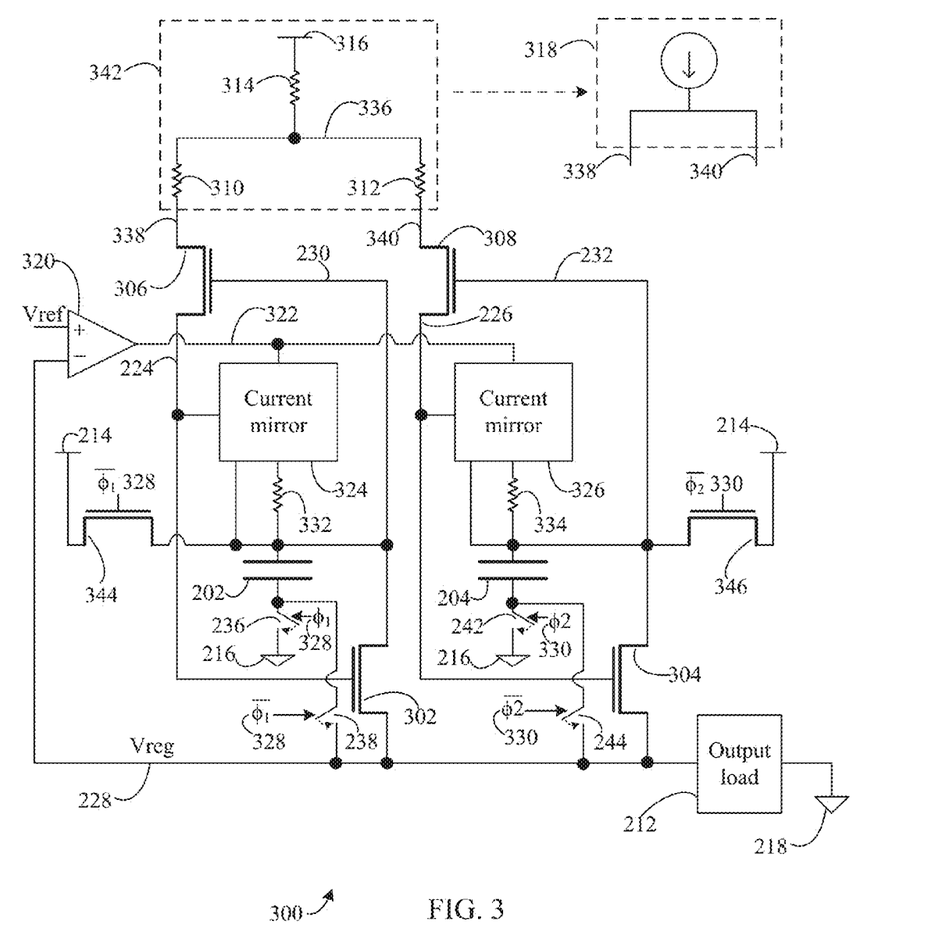
FIG. 3 is a circuit diagram of a portion of a ping-pong charge pump, according to another exemplary embodiment.

For instance, FIG. 3 shows a circuit diagram of a ping-pong charge pump 300, according to an embodiment. In some embodiments, ping-pong charge pump 300 may be a further embodiment of ping-pong charge pump 200 shown in FIG. 2. Ping-pong charge pump 300, as illustrated, includes first flying capacitor 202 (hereinafter, "first capacitor"), second flying capacitor 204 (hereinafter, "second capacitor"), a first switch 302, a second switch 304, a third switch 306, a fourth switch 308, a fifth switch 344, a sixth switch 346, a first current mirror 324, a second current mirror 326, and output load 212. Ping-pong charge pump 300 and each of the components included therein may include functionality and connectivity beyond what is shown in FIG. 3, as would be apparent to persons skilled in relevant art(s). However, such additional functionality is not shown in FIG. 3 for the sake of brevity. Additionally, it should be noted that embodiments of ping-pong charge pump 300 may exclude output load 212 shown in FIG. 3 for illustrative purposes.

In the embodiment depicted in FIG. 3, first switch 302, second switch 304, third switch 306, and fourth switch 308 are depicted as pMOS transistors, but it should be understood that in alternate embodiments, nMOS transistors may be utilized to implement and/or perform the techniques and configurations described herein. Further, in some embodiments, first switch 302 may be a further embodiment of first switch 208 of FIG. 2, and second switch 304 may be a further embodiment of second switch 210 of FIG. 2. Ping-pong charge pump 300 may also include second clock switch 236, third clock switch 238, fifth clock switch 242, and sixth clock switch 244, as described above with respect to FIG. 2.

As shown in FIG. 3, ping-pong charge pump 300 may also include a first resistor 310 and a second resistor 312 connected to a third resistor 314 via connection 336 and connected to the source of third switch 306 via a connection 338 and to the source of fourth switch 308 via a connection 340, respectively. Third resistor 314 may also be connected to a voltage source 316, as shown. In embodiments, first resistor 310, second resistor 312, third resistor 314, and voltage source 316 may comprise at least a portion of current provider circuit 206, shown in FIG. 2, and may be referred to as a sensing circuit 342. In embodiments, third switch 306 and fourth switch 308 may also be included in current provider circuit 206 and/or in sensing circuit 342. In an embodiment, first resistor 310, second resistor 312, third resistor 314, and voltage source 316 may be alternately implemented using a current source 318 as illustrated.

The drain of third switch 306 may be connected to the gate of first switch 302 and to first current mirror 324 via connection 224. The gate of third switch 306 may be connected to the top plate of first capacitor 202 and to the source of first switch 302 via connection 230. The top plate of first capacitor 202 is also connected to first current mirror 324 and a fourth resistor 332 via connection 230. The bottom plate of first capacitor 202 is connected to charge pump ground 216 via second clock switch 236, and to voltage Vreg on connection 228 via third clock switch 238. Second clock switch 236 may be controlled by a clock signal such as a first clock signal $\phi_1$ 328 which may be a further embodiment of $\phi_1$ 246 of FIG. 2; third clock switch 238 may be controlled using an inverted instance of the clock signal that controls second clock switch 236, such as first clock signal $\overline{\phi_1}$ 328. Fourth resistor 332 is also connected to first current mirror 324 as shown. The drain of first switch 302 is connected to output load 212 via regulation voltage connection 228 which holds a regulation voltage Vreg. Output load 212 may be connected to load ground 218 as shown. First current mirror 324 receives a voltage input on a connection 322 from a voltage source 320 (shown in FIG. 3 as a low drop out ("LDO") voltage regulator with a reference voltage Vref and regulation voltage Vreg as inputs).

The drain of fourth switch 308 may be connected to the gate of second switch 304 and to second current mirror 326 via connection 226. The gate of fourth switch 308 may be connected to the top plate of second capacitor 204 and to the source of second switch 304 via connection 232. The top plate of second capacitor 204 is also connected to second current mirror 326 and a fifth resistor 334 via connection 232. The bottom plate of second capacitor 204 is connected to charge pump ground 216 via fifth clock switch 242, and to voltage Vreg on connection 228 via sixth clock switch 244. Fifth clock switch 242 may be controlled using a clock signal such as a second clock signal $\phi_2$ 330 which may be a further embodiment of $\phi_2$ 248 of FIG. 2; sixth clock switch 244 may be controlled using an inverted instance of clock signal that controls fifth clock switch 242, such as second clock signal $\overline{\phi_2}$ 330. Fifth resistor 334 is also connected to second current mirror 326 as shown. The drain of second switch 304 is connected to output load 212 via regulation voltage connection 228. Second current mirror 326 receives a voltage input on connection 322 from voltage source 320.

Fifth switch 344 and sixth switch 346, as illustrated, are implemented as PMOS transistors, although other switch implementations and/or types are contemplated as described herein. In embodiments, fifth switch 344 and sixth switch 346 may be further embodiments of first clock switch 234 and fourth clock switch 240 of FIG. 2, respectively. As shown, fifth switch 344 is connected to voltage source 214 at its drain and to the top plate of first capacitor 202 at its source. The gate of fifth switch 344 is controlled by first clock signal $\overline{\phi_1}$ 328. First capacitor 202 is configured to be charged by voltage source 214 through fifth switch 344 as illustrated. As shown, sixth switch 346 is connected to voltage source 214 at its drain and to the top plate of second capacitor 204 at its source. The gate of sixth switch 346 is controlled by second clock signal $\overline{\phi_2}$ 330. Second capacitor 204 is configured to be charged by voltage source 214 through sixth switch 346 as illustrated.

The source of first clock signal $\phi_1$ 328 and second clock signal $\phi_2$ 330 (not shown) may be any known or future clock signal. Additionally, the application of these clock signals is discussed in further detail below with respect to FIG. 4. For example, fifth switch 344, sixth switch 346, second clock switch 236, third clock switch 238, fifth clock switch 242, and sixth clock switch 244 described above may close (activate) and open (deactivate) according to the cycle of a clock signal (e.g., first clock signal $\phi_1$328 and/or second clock signal $\phi_2$330, or an instance thereof), in embodiments, and commensurate with the description of ping-pong charge pump 300 described in this Section.

First capacitor 202 is configured to drive output load 212. In embodiments, first capacitor 202 may source current to drive output load 212 through first switch 302 when first switch 302 is activated (i.e., closed). As noted, first capacitor 202 is also configured to store charge (i.e., to be charged) from voltage source 214.

Second capacitor 204 is configured to drive output load 212. In embodiments, second capacitor 204 may source current to drive output load 212 through second switch 304 when second switch 304 is activated (i.e., closed). As noted, second capacitor 204 is also configured to store charge (i.e., to be charged) from voltage source 214.

First resistor 310, second resistor 312, third resistor 314, fourth resistor 332, and fifth resistor 334 may be any type of resistive element, and may include characteristics and impedance values selected for design-specific voltage and current levels. Fourth resistor 332 and fifth resistor 334 are configured to act as current-to-voltage converters, in embodiments, to convert differential control currents (e.g., on connection 224 and connection 226) to gate voltages (e.g., at first switch 302 and at second switch 304) to activate or deactivate the switches.

First resistor 310 and second resistor 312 may be configured to perform as degenerate resistors, according to embodiments. For instance, as shown in FIG. 3, first resistor 310 and second resistor 312 are configured as degenerate resistors and thus expand the linear input range of ping-pong charge pump 300.

First current mirror 324 and second current mirror 326 may be of any current mirror configuration. First current mirror 324 and second current mirror 326 may each include a switch and/or transistor, not shown, to activate and/or deactivate first current mirror 324 and second current mirror 326 based on a signal such as a clock signal (e.g., first clock signal $\phi_1$ 328 and/or second clock signal $\phi_2$ 330, or instances thereof).

Ping-pong charge pump 300 is configured to provide differential control currents (e.g., a first differential control current) to the gate of first switch 302 from third switch 306 via connection 224 and to provide differential control currents (e.g., a second differential control current) to the gate of second switch 304 from fourth switch 308 via connection 226. Third switch 306 is configured to monitor or sense the voltage present at first capacitor 202 via connection 230, and fourth switch 308 is configured to monitor or sense the voltage present at second capacitor 204 via connection 232. A first differential control current and a second differential control current, as described, may be provided through third switch 306 and/or fourth switch 308, respectively, based on the difference between the voltage present at first capacitor 202 and the voltage present at second capacitor 204. Accordingly, ping-pong charge pump 300 is configured to control the equalization of voltages present at first capacitor 202 and second capacitor 204 based on the difference between the voltage present at first capacitor 202 and the voltage present at second capacitor 204.

For instance, the gate of third switch 306 may sense the voltage present at first capacitor 202, and the gate of fourth switch 308 may sense the voltage present at second capacitor 204. If the voltage present at first capacitor 202 is less than the voltage present at second capacitor 204, the lower voltage sensed by the gate of third switch 306 will cause third switch 306 to activate (i.e., close), and a first differential control current may be provided to the gate of first switch 302 from third switch 306 via connection 224 to open first switch 302 and prevent (i.e., disable) first capacitor 202 from driving output load 212. A second differential control current may be provided to the gate of second switch 304 from fourth switch 308 via connection 226 to activate (i.e., close) second switch 304 and allow (i.e., enable) second capacitor 204 to drive output load 212. In this example, the gate of fourth switch 308 may sense the voltage present at second capacitor 204 that is higher than the voltage present at first capacitor 202 sensed by third switch 306, and a second differential control current may be provided to the gate of second switch 304.

As second capacitor 204 drives output load 212 and sources current to output load 212, the voltage present at second capacitor 204 decreases. The gate of fourth switch 308 is configured to monitor and/or sense the voltage present at second capacitor 204 as it drives output load 212, and when the voltage present at second capacitor 204 is equal to (or approximately equal to) the voltage present at first capacitor 202, another differential control current is provided to the gate of first switch 302 from third switch 306 causing first switch 302 to close and allow (i.e., enable) first capacitor 202 to drive output load 212 (along with second capacitor 204, in embodiments). In this way, the voltages of first capacitor 202 and second capacitor 204 may be equalized without an equalization switch, such as equalization switch 102 of FIG. 1.

In embodiments, the differential control current that is applied to open first switch 302 and disable first capacitor 202 may cease to be applied from third switch 306. In some embodiments, ceasing to provide the differential control current to disable first capacitor 202 may include providing another and/or a different differential control current to first switch 302.

In the embodiments described herein, one or more differential control currents may be provided by sensing circuit 342 and/or current source 318, as noted above. It should also be noted that while first capacitor 202 is described as being disabled from driving output load 212 in the example described above, in embodiments when the voltage present at second capacitor 204 is less than the voltage present at first capacitor 202, second capacitor 202 may be disabled from driving output load 212 by providing a differential control current to second switch 304 via connection 226. In other words, each of first capacitor 202 and second capacitor 204 may be disabled from driving output load 212 depending on the monitored and/or sensed voltages of the respective capacitors as described above.

Ping-pong charge pump 300 is also configured to control the equalization of voltages present at first capacitor 202 and second capacitor 204 based on the operational phases described herein. For instance, fifth switch 344 and sixth switch 346 may be used to allow voltage source 214 to charge first capacitor 202 and second capacitor 204, respectively. First clock signal $\overline{\phi_1}$ 328 controls the activation of fifth switch 344, and second clock signal $\overline{\phi_2}$ 330 controls the activation of sixth switch 346. That is, when first clock signal $\overline{\phi_1}$ 328 and second clock signal $\overline{\phi_2}$ 330 go "low," fifth switch 344 and sixth switch 346 are activated (i.e., closed), and first capacitor 202 and second capacitor 204 are charged. During charging, the voltages present at first capacitor 202 and second capacitor 204 are equalized as both capacitors are charged from the same voltage source (i.e., voltage source 214). It should be noted that the time periods in which first capacitor 202 and second capacitor 204 are charged need not be the same length and/or begin at the same time, and in embodiments, may partially overlap as described in the next Section below. First current mirror 324 and second current mirror 326 may be deactivated during charging causing first switch 302 and second switch 304 to deactivate thus preventing and/or disabling first capacitor 202 and second capacitor 204 from driving output load 212.

When first clock signal $\overline{\phi_1}$ 328 and second clock signal $\overline{\phi_2}$ 330 go "high," fifth switch 344 and sixth switch 346 are deactivated (i.e., opened), and first capacitor 202 and second capacitor 204 are used to regulate the output voltage of ping-pong charge pump 300 and drive output load 212. First current mirror 324 and second current mirror 326 may be activated during regulation. First switch 302 and second switch 304 may then be used to allow and/or enable first capacitor 202 and second capacitor 204 to driving output load 212, as described herein.

For example, first clock signal $\overline{\phi_1}$ 328 may go low while second clock signal $\overline{\phi_2}$ 330 is high, thus charging first capacitor 202 while second capacitor 204 regulates an output voltage of ping-pong charge pump 300. First current mirror 324 is deactivated, and first capacitor 202 does not drive output load 212. Second current mirror 326 remains activated, and second capacitor 204 drives output load 212. While first clock signal $\overline{\phi_1}$ 328 remains low, second clock signal $\overline{\phi_2}$ 330 may also transition low. This transition of second clock signal $\overline{\phi_2}$ 330 may take place at approximately half way through the time period in which first clock signal $\overline{\phi_1}$ 328 remains low. As both first clock signal $\overline{\phi_1}$ 328 and second clock signal $\overline{\phi_2}$ 330 are low, both first current mirror 324 and second current mirror 326 are deactivated, and thus first capacitor 202 and second capacitor 204 are charging and are disabled from driving output load 212. The voltages present at first capacitor 202 and second capacitor 204 are equalized while both capacitors are charged. When first clock signal $\overline{\phi_1}$ 328 transitions high, first capacitor 202 ceases to charge and begins to regulate the output voltage of ping-pong charge pump 300 and drive output load 212. Second clock signal $\overline{\phi_2}$ 330 remains low, and second capacitor 204 continues to charge. The transition of second clock signal $\overline{\phi_2}$ 330 from low to high may take place at approximately half way through the time period in which first clock signal $\overline{\phi_1}$ 328 remains high. As both first clock signal $\overline{\phi_1}$ 328 and second clock signal $\overline{\phi_2}$ 330 are high, both first current mirror 324 and second current mirror 326 are activated, and thus first capacitor 202 and second capacitor 204 are regulating and are enabled to drive output load 212. The voltages present at first capacitor 202 and second capacitor 204 may equalized while both capacitors are regulating by using the differential control currents described herein.

The ping-pong charge pump embodiments described above may perform their functions according to the exemplary phase and voltage level embodiments described in the next Section.

4. Example Phase and Voltage Level Embodiments for Ping-Pong Charge Pumps

Figure 4:
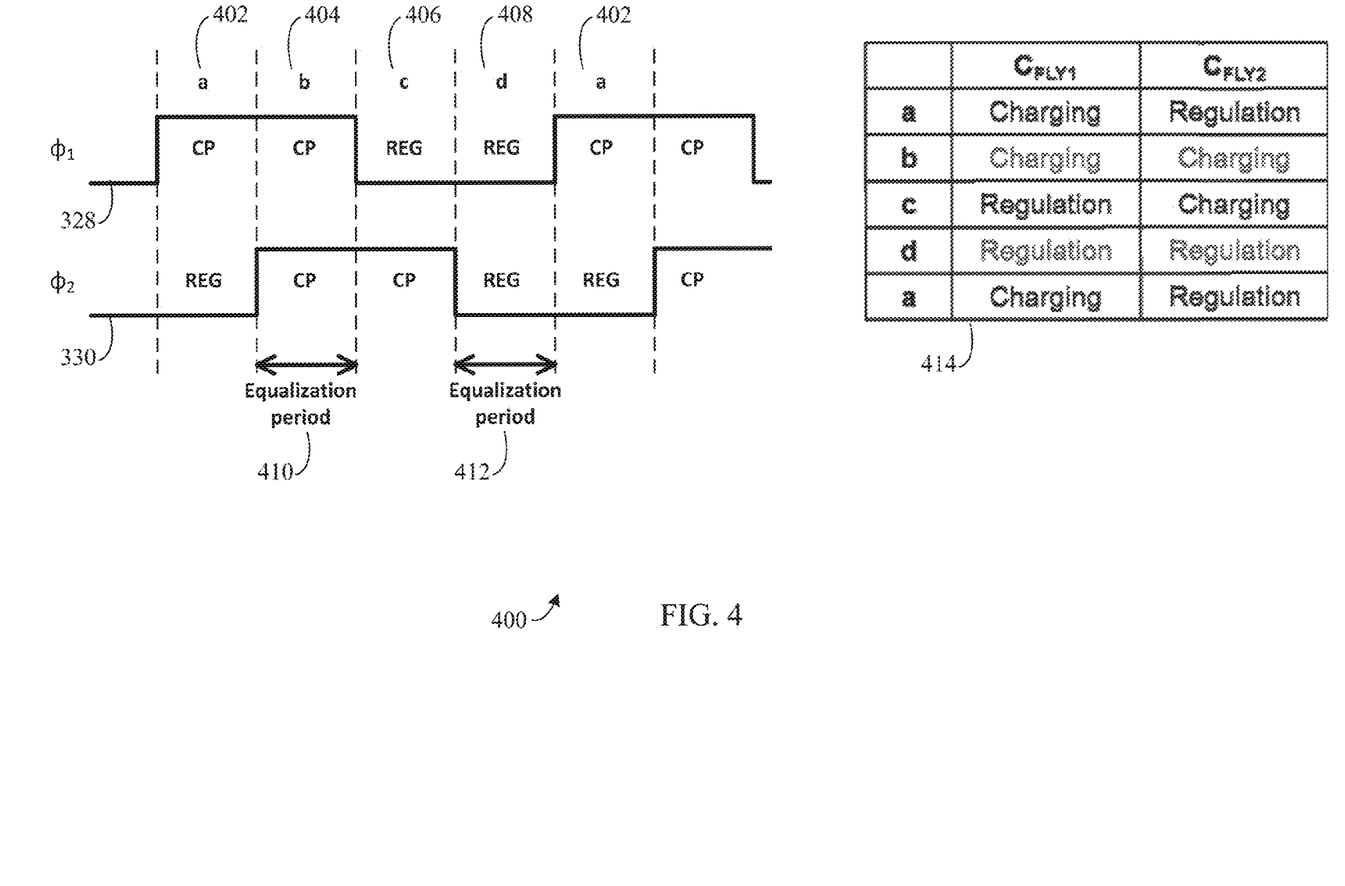
FIG. 4 is a phase timing diagram of a ping-pong charge pump, according to an exemplary embodiment.

In the embodiments described herein, ping-pong charge pumps are configured to operate in accordance with operational phases, and according to voltage levels present at flying capacitors in the ping-pong charge pumps. For example, FIG. 4 shows a phase timing diagram 400 of a ping-pong charge pump, according to an exemplary embodiment. Phase timing diagram 400 illustrates first clock signal $\phi_1$ 328 associated with a first flying capacitor $C_{FLY1}$ (e.g., first capacitor 202) and second clock signal $\phi_2$ 330 associated with a second flying capacitor $C_{FLY2}$ (e.g., second capacitor 204). As illustrated, first clock signal $\phi_1$ 328 is 90° out of phase with second clock signal $\phi_2$ 330 (i.e., first clock signal $\phi_1$ 328 leads second clock signal $\phi_2$ 330 by one quarter period). Ping-pong charge pump 200 and ping-pong charge pump 300 may each operate in accordance with phase timing diagram 400.

In operating according to first clock signal $\phi_1$ 328, first flying capacitor $C_{FLY1}$ alternates between charging ("CP") when first clock signal $\phi_1$ 328 is high and regulating output voltage ("REG") when first clock signal $\phi_1$ 328 is low, as shown. In operating according to second clock signal $\phi_2$ 330, second flying capacitor $C_{FLY2}$ alternates between charging ("CP") when second clock signal $\phi_2$ 330 is high and regulating output voltage ("REG") when second clock signal $\phi_2$ 330 is low, as shown. The 90° phase shift between first clock signal $\phi_1$ 328 and second clock signal $\phi_2$ 330 creates a plurality of sequential phases through which a ping-pong charge pump (e.g., ping-pong charge pump 200 and ping-pong charge pump 300) may operate: a phase a 402, a phase b 404, a phase c 406, and a phase d 408. The alignment of time periods in which both first flying capacitor $C_{FLY1}$ and second flying capacitor $C_{FLY2}$ are both charging or are both regulating correspond to phase b 404 and phase d 408, respectively, and these phases may be used as a first equalization period 410 and a second equalization period 412. Equalization of the voltages of first flying capacitor $C_{FLY1}$ (e.g., first capacitor 202) and second flying capacitor $C_{FLY2}$ (e.g., second capacitor 204) may be performed as described above with respect to FIGS. 2 and 3. A tabulated representation of the charging and regulating operations of first flying capacitor $C_{FLY1}$ and second flying capacitor $C_{FLY2}$ is shown table 414 of FIG. 4.

Figure 5:
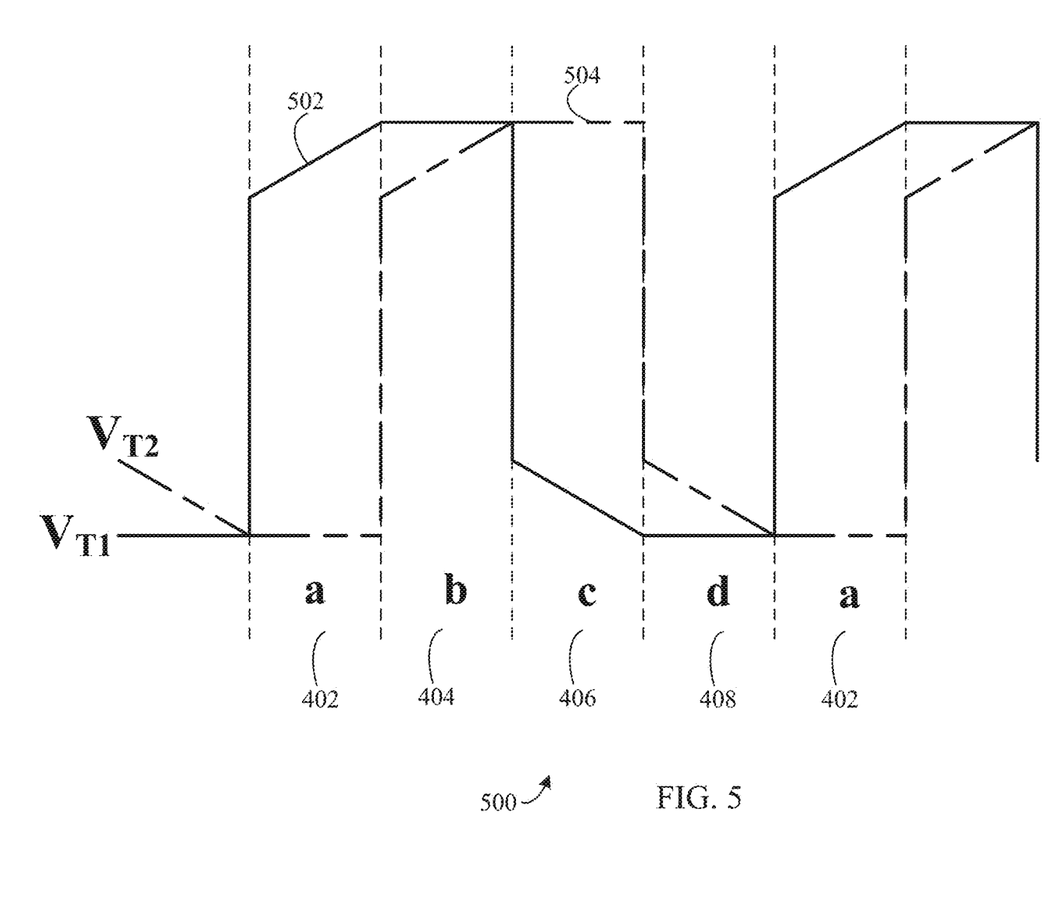
FIG. 5 is a flying capacitor top-plate voltage diagram for a ping-pong charge pump, according to an exemplary embodiment.

FIG. 5 shows a flying capacitor voltage diagram 500 for a ping-pong charge pump, according to an exemplary embodiment. Ping-pong charge pump 200 and ping-pong charge pump 300 may each operate in accordance with voltage diagram 500.

Voltage diagram 500 includes an operational approximation of a first voltage $V_{T1}$ 502 and a second voltage $V_{T2}$. In an embodiment, first voltage $V_{T1}$ 502 may correspond to first flying capacitor $C_{FLY1}$ (e.g., first capacitor 202) and second voltage $V_{T2}$ 504 may correspond to second flying capacitor $C_{FLY2}$ (e.g., second capacitor 204), as described above with respect to FIG. 4. Also shown in FIG. 5 are phase a 402, phase b 404, phase c 406, and phase d 408, as described with respect to FIG. 4. As illustrated, during phase a 402, first flying capacitor $C_{FLY1}$ begins charging while second flying capacitor $C_{FLY2}$ regulates an output voltage. During phase b 404, first flying capacitor $C_{FLY1}$ is charged while second flying capacitor $C_{FLY2}$ begins charging, resulting in a voltage difference between first flying capacitor $C_{FLY1}$ and second flying capacitor $C_{FLY2}$, even though both capacitors are receiving charge. During phase c 406, first flying capacitor $C_{FLY1}$ begins regulating the output voltage while second flying capacitor $C_{FLY2}$ is charged. During phase d 408, first flying capacitor $C_{FLY1}$ continues regulating the output voltage while second flying capacitor $C_{FLY2}$ begins regulating the output voltage, resulting in a voltage difference between first flying capacitor $C_{FLY1}$ and second flying capacitor $C_{FLY2}$, even though both capacitors are regulating the output voltage.

It should be noted that the voltage differences between first flying capacitor $C_{FLY1}$ and second flying capacitor $C_{FLY2}$ described above relatively smaller than the voltage differences between the prior art capacitors described with respect to FIG. 1 above at equalization time. For example, as shown in FIG. 1, when snapback moment 120 occurs, voltage $V_{T2}$ 118 is at its highest while voltage $V_{T1}$ 116 is near its lowest. This large voltage difference contributes greatly to the snapback problem described above, especially given that prior art solutions implement equalization switches, such as equalization switch 102. As shown in FIG. 5, the difference between first voltage $V_{T1}$ 502 and second voltage $V_{T2}$ 504 are significantly smaller at the beginning of regulation phases, e.g., phase b 404 and phase d 408. Thus, the described technique significantly reduces snapback even when a ping-ping charge pump is implemented using an equalization switch, as in FIG. 1.

Equalization of the voltages of first flying capacitor $C_{FLY1}$ and second flying capacitor $C_{FLY2}$ may be performed as described above with respect to FIGS. 2, 3, and 4.

5. Further Example Embodiments and Advantages for Ping-Pong Charge Pumps

The embodiments described herein provide for improved ping-pong charge pump operation and voltage equalization. As shown herein, the techniques described also provide benefits to existing solutions which may be modified in operation to reduce snapback. Embodiments also provide for alternatives that prevent snapback by configuring ping-pong charge pumps that do not include equalization switches. Snapback prevention and mitigation improves product yield and lifetimes by reducing damage to components in ping-pong charge pumps. These embodiments provide additional benefit for ping-pong charge pump circuits by allowing for simplified implementations using significantly reduced area due to the exclusion of equalization switches. Because snapback may also occur during the normal operation of conventional solutions, embodiments that allow for the exclusion of an equalization switch are robust and reliable in elimination of snapback states. The exclusion of an equalization switch also removes potential reliability issues that are caused by large terminal voltages that may be present on equalization switches. It should also be noted that the embodiments herein are more efficient with respect to power and area use, than conventional solutions that handle snapback states using clams and/or diodes.

The embodiments herein also provide for extended equalization periods by operating flying capacitors out of phase with each other. The extended equalization periods allow for smoother voltage outputs over conventional solutions by reducing and/or eliminating output voltage ripple at the ping-pong charge pump output. Output noise is also reduced using the techniques described.

Figure 8:
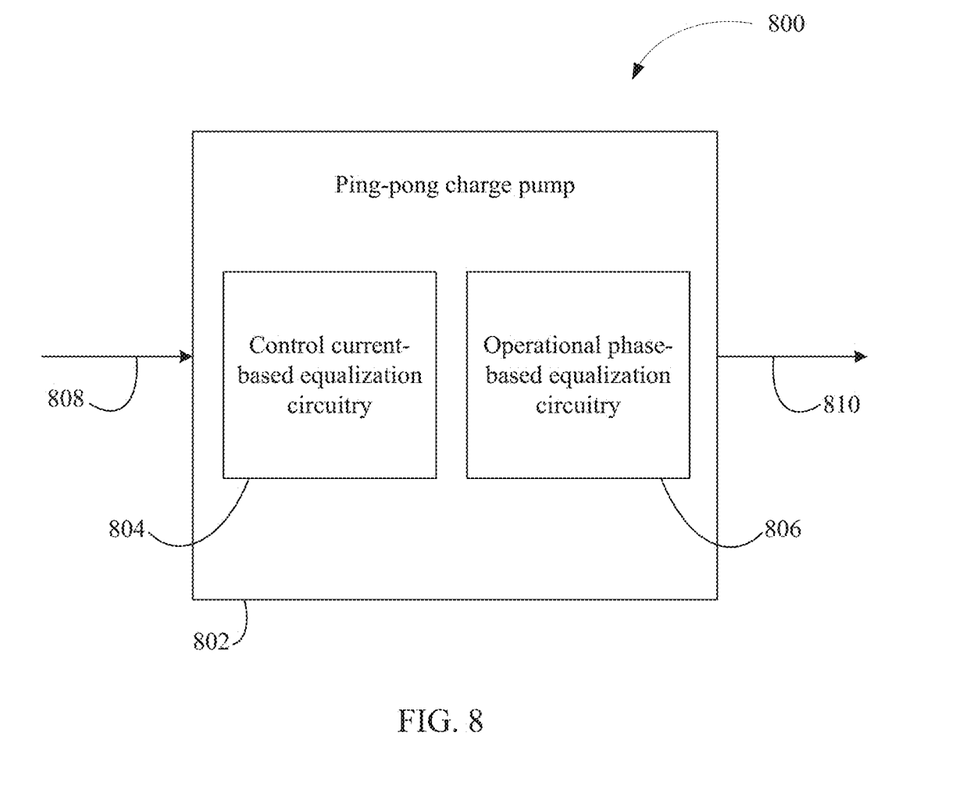
FIG. 8 is a block diagram of a ping-pong charge pump implementation, according to an exemplary embodiment.

The described embodiments may be applicable across a wide range of technologies and products that utilize charge pumps and ping-pong charge pumps such as, but not limited to, data communication devices (e.g., cable modems and DSL modems), communication devices, computing devices, and/or the like. For example, FIG. 8 shows an example implementation 800 of a ping-pong charge pump 802, according to an embodiment. In some embodiments, ping-pong charge pump 802 may be a further embodiment of ping-pong charge pump 200 shown in FIG. 2 and/or ping-pong charge pump 300 shown in FIG. 3. Ping-pong charge pump 802, as illustrated, includes control current-based equalization circuitry 804 and operational phase-based equalization circuitry 806. Ping-pong charge pump 802 and each of the components included therein may include functionality and connectivity beyond what is shown in FIG. 8, as would be apparent to persons skilled in relevant art(s). However, such additional functionality is not shown in FIG. 3 for the sake of brevity.

Control current-based equalization circuitry 804 may comprise one or more components described with respect to ping-pong charge pump 200 shown in FIG. 2 and/or ping-pong charge pump 300 shown in FIG. 3. For instance, control current-based equalization circuitry 804 may include sensing circuit 342. Control current-based equalization circuitry 804 is configured to perform capacitor voltage equalization, as described herein, without the use of an equalization switch.

Operational phase-based equalization circuitry 806 may comprise one or more components described with respect to ping-pong charge pump 200 shown in FIG. 2 and/or ping-pong charge pump 300 shown in FIG. 3. For instance, operational phase-based equalization circuitry 806 may include fifth switch 344 and sixth switch 346. Operational phase-based equalization circuitry 806 is configured to perform capacitor voltage equalization, as described herein, without the use of an equalization switch.

As illustrated, ping-pong charge pump 802 receives an input via input connection 808, and ping-pong charge pump 802 provides an output via output connection 810. In embodiments, the input received via input connection 808 may be an external DC voltage source such as an AC-DC adapter, a battery, and/or the like. In embodiments, ping-pong charge pump 300 may be configured to act as a voltage regulator with respect to an external voltage source. The output provided on output connection 810 may be driven and/or regulated by ping-pong charge pump 802 as similarly described with respect to ping-pong charge pump 200 (shown in FIG. 2) and/or ping-pong charge pump 300 (shown in FIG. 3).

It will be recognized that the systems, their respective components, and/or the techniques described herein may be implemented in hardware, software, firmware, or any combination thereof, and/or may be implemented as hardware logic/electrical circuitry. The disclosed technologies can be put into practice using software, firmware, and/or hardware implementations other than those described herein. Any software, firmware, and hardware implementations suitable for performing the functions described herein can be used, such as those described below.

6. Example Operational Embodiments

Figure 6:
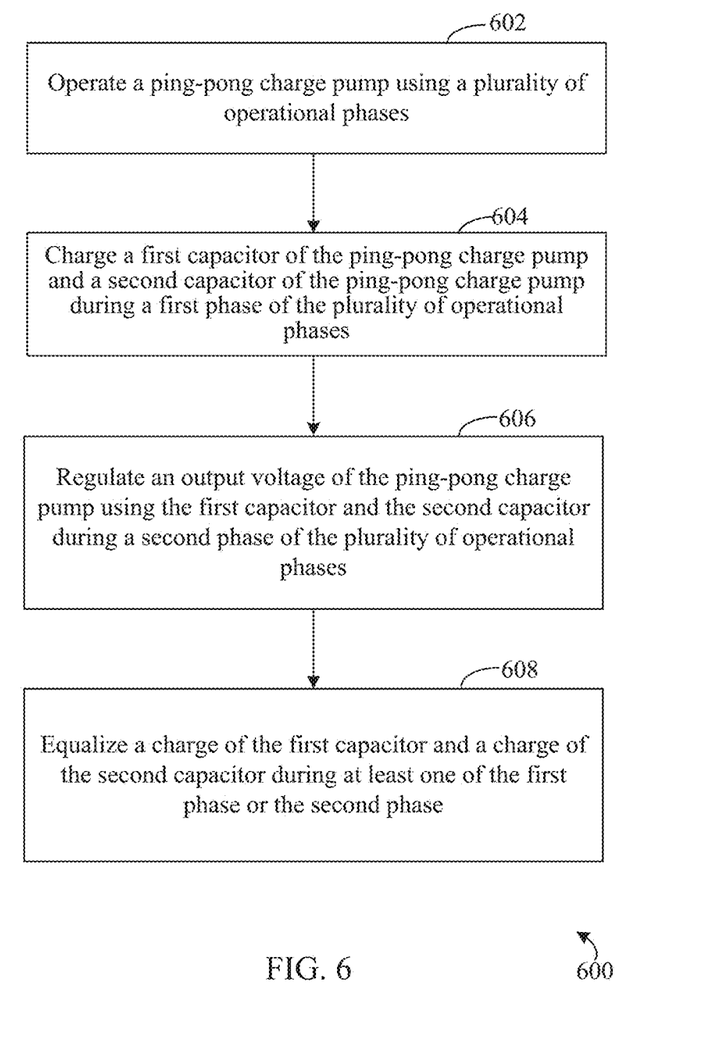
FIG. 6 is a flowchart providing example steps for performing equalization using a ping-pong charge pump, according to an exemplary embodiment.

The embodiments described herein may perform their functions in various ways. For example, FIG. 6 shows a flowchart 600 providing example steps for performing equalization in a ping-pong charge pump, according to an exemplary embodiment. Ping-pong charge pump 200 of FIG. 2, ping-pong charge pump 300 FIG. 3, and/or any of their respective components/circuits may each operate according to flowchart 600, in embodiments. Other structural and operational embodiments will be apparent to persons skilled in the relevant art(s) based on the discussion regarding flowchart 600. Flowchart 600 is described as follows.

Flowchart 600 may begin with step 602. In step 602, a ping-pong charge pump operates using a plurality of operational phases. In embodiments, a ping-pong charge pump (e.g., ping-pong charge pump 200 and/or ping-pong charge pump 300) may iteratively operate through a plurality of sequential phases, such as phase a 402, phase b 404, phase c 406, and phase d 408, as shown in FIG. 4.

In step 604, a first capacitor of the ping-pong charge pump is charged and a second capacitor of the ping-pong charge pump is charged during a first phase of the plurality of operational phases. For example, as shown in FIG. 4, first flying capacitor $C_{FLY1}$ (e.g., first capacitor 202 of FIGS. 2 and 3) and second flying capacitor $C_{FLY2}$ (e.g., second capacitor 204 of FIGS. 2 and 3) are both charged during phase b 404.

In step 606, an output voltage of the ping-pong charge pump is regulated using the first capacitor and the second capacitor during a second phase of the plurality of operational phases. For example, as shown in FIG. 4, first flying capacitor $C_{FLY1}$ (e.g., first capacitor 202 of FIGS. 2 and 3) and second flying capacitor $C_{FLY2}$ (e.g., second capacitor 204 of FIGS. 2 and 3) are both regulating an output voltage during phase d 408.

In step 608, a charge of the first capacitor and a charge of the second capacitor are equalized during at least one of the first phase or the second phase. For example, as shown in FIG. 4, the voltages of first flying capacitor $C_{FLY1}$ (e.g., first capacitor 202 of FIGS. 2 and 3) and second flying capacitor $C_{FLY2}$ (e.g., second capacitor 204 of FIGS. 2 and 3) may be equalized during phase b 404 and/or phase d 408 corresponding to first equalization period 410 and/or second equalization period 412, respectively.

In some example embodiments, one or more steps 602, 604, 606, and/or 608 of flowchart 600 may not be performed. Moreover, steps in addition to or in lieu of steps 602, 604, 606, and/or 608 may be performed. Further, in some example embodiments, one or more of steps 602, 604, 606, and/or 608 may be performed out of order, in an alternate sequence, or partially (or completely) concurrently with other steps.

Figure 7:
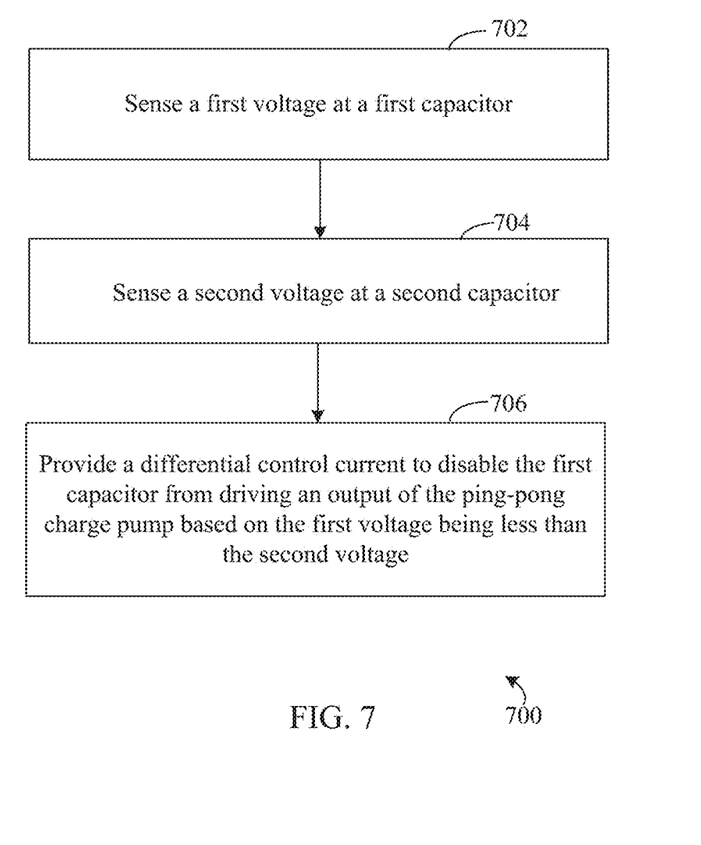
FIG. 7 is a flowchart providing example steps for performing equalization using a ping-pong charge pump, according to an exemplary embodiment.

FIG. 7 shows a flowchart 700 providing example steps for performing equalization in a ping-pong charge pump, according to an exemplary embodiment. Ping-pong charge pump 200 of FIG. 2, ping-pong charge pump 300 FIG. 3, and/or any of their respective components/circuits may each operate according to flowchart 700, in embodiments. Other structural and operational embodiments will be apparent to persons skilled in the relevant art(s) based on the discussion regarding flowchart 700. Flowchart 700 is described as follows.

Flowchart 700 may begin with step 702. In step 702, a first voltage at a first capacitor is sensed. For example, a voltage at the top plate of first capacitor 202 (as described in FIG. 2 and/or FIG. 3) may be sensed by current provider circuit 206 (via connection 220 as in FIG. 2) or by third switch 306 (at the gate of third switch 306 as in FIG. 3).

In step 704, a second voltage at a second capacitor is sensed. For example, a voltage at the top plate of second capacitor 204 (as described in FIG. 2 and/or FIG. 3) may be sensed by current provider circuit 206 (via connection 222 as in FIG. 2) or by fourth switch 308 (at the gate of fourth switch 308 as in FIG. 3).

In step 706, a differential control current is provided to disable the first capacitor from driving an output of the ping-pong charge pump based on the first voltage being less than the second voltage. For example, as described above with respect to FIG. 2, current provider circuit 206 may provide a differential control current to first switch 208 via connection 224 to disable first capacitor 202 from driving output load 212 when the voltage at first capacitor 202, sensed by current provider circuit 206 via connection 220, is less than the voltage at second capacitor 204 sensed by current provider circuit 206 via connection 222. The provided differential control current opens (i.e., deactivates) first switch 208 as described above.

Similarly, as described above with respect to FIG. 3, third switch 306 may provide a differential control current to the gate of first switch 302 via connection 224 to disable first capacitor 202 from driving output load 212 when the voltage at first capacitor 202, sensed by the gate of third switch 306, is less than the voltage at second capacitor 204. The provided differential control current opens (i.e., deactivates) third switch 306 as described herein. The providing of the differential control current based on the voltage difference between first capacitor 202 and second capacitor 204 allows for equalization of the capacitors' voltages.

In some example embodiments, one or more steps 702, 704, and/or 706 of flowchart 700 may not be performed. Moreover, steps in addition to or in lieu of steps 702, 704, and/or 706 may be performed. Further, in some example embodiments, one or more of steps 702, 704, and/or 706 may be performed out of order, in an alternate sequence, or partially (or completely) concurrently with other steps.

7. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:
1. A method, comprising:
  operating a ping-pong charge pump using a plurality of operational phases;
  charging a first capacitor of the ping-pong charge pump and a second capacitor of the ping-pong charge pump during a first phase of the plurality of operational phases;

regulating an output voltage of the ping-pong charge pump using the first capacitor and the second capacitor during a second phase of the plurality of operational phases;

equalizing a charge of the first capacitor and a charge of the second capacitor during the first phase and the second phase; and charging only one of the first capacitor or the second capacitor during an additional phase of the plurality of operational phases.

2. The method of claim 1, wherein the additional phase is a third phase of the plurality of operational phases; and further comprising:

charging the first capacitor of the ping-pong charge pump and regulating the output voltage of the ping-pong charge pump using the second capacitor of the ping-pong charge pump during the third phase of the plurality of operational phases; and charging the second capacitor of the ping-pong charge pump and regulating the output voltage of the ping-pong charge pump using the first capacitor of the ping-pong charge pump during a fourth phase of the plurality of operational phases.

3. The method of claim 2, wherein the third phase occurs after the first phase and before the second phase, and wherein the fourth phase occurs after the second phase.

4. The method of claim 3, wherein a duration of the first phase, a duration of the second phase, a duration of the third phase, and a duration of the fourth phase are approximately equal.

5. The method of claim 3, further comprising:

iteratively operating the ping-pong charge pump through the first phase, the third phase, the second phase, and the fourth phase sequentially to drive an output load of the ping-pong charge pump.

6. The method of claim 1, wherein equalizing the charge of the first capacitor and the charge of the second capacitor is controlled by one or more differential currents provided by at least one of a current source or a sensing circuit.

7. The method of claim 6, wherein a first differential current of the one or more differential currents is provided to enable or disable the first capacitor, and wherein a second differential current of the one or more differential currents is provided to enable or disable the second capacitor.

8. A method for equalizing a ping-pong charge pump, comprising:

sensing a first voltage at a first capacitor;

sensing a second voltage at a second capacitor;

providing a differential control current to disable the first capacitor from driving an output of the ping-pong charge pump based on the first voltage being less than the second voltage.

9. The method for equalizing a ping-pong charge pump of claim 8, further comprising:

driving the output of the ping-pong charge pump using the second capacitor; and equalizing the voltages present at the first capacitor and the second capacitor.

10. The method for equalizing a ping-pong charge pump of claim 9, further comprising:

subsequent to providing the differential control current to disable the first capacitor:

sensing a third voltage at the first capacitor;

sensing a fourth voltage at the second capacitor; and ceasing to provide the differential control current to enable the first capacitor to drive the output of the ping-pong charge pump based on the third voltage being approximately equal to the fourth voltage.

11. The method for equalizing a ping-pong charge pump of claim 10, further comprising:

driving the output of the ping-pong charge pump using the second capacitor and the first capacitor in response to enabling the first capacitor to drive the output.

12. The method for equalizing a ping-pong charge pump of claim 9, further comprising:

providing the differential control current from at least one of a sensing circuit or a current source.

13. The method for equalizing a ping-pong charge pump of claim 12, further comprising:

providing the differential control current to a first current mirror associated with the first capacitor to disable the first capacitor.

14. A ping-pong charge pump that comprises:

a first capacitor configured to source a first driving current to an output load;

a second capacitor configured to source a second driving current to the output load; and a current provider circuit electrically coupled to the first capacitor and to the second capacitor, the current provider circuit being configured to:

provide at least one of a first differential control current to disable the sourcing of the first capacitor or a second differential control current to disable the sourcing of the second capacitor, the first and second differential control currents being based at least on a difference between a voltage of the first capacitor and a voltage of the second capacitor.

15. The ping-pong charge pump of claim 14, wherein the first capacitor is configured to source the first driving current during a first time period, wherein the second capacitor is configured to source the second driving current during a second time period, and wherein the first time period and the second time period at least partially overlap to create a third time period.

16. The ping-pong charge pump of claim 15, wherein the first capacitor is configured to be charged during a fourth time period, wherein the second capacitor is configured to be charged during a fifth time period, and wherein the fourth time period and the fifth time period at least partially overlap to create a sixth time period.

17. The ping-pong charge pump of claim 16, wherein the first capacitor and the second capacitor are configured to have their voltages equalized during at least one of the third time period or the sixth time period.

18. The ping-pong charge pump of claim 15, wherein the current provider circuit comprises a sensing circuit.

19. The ping-pong charge pump of claim 15, wherein the current provider circuit comprises a current source.

20. The ping-pong charge pump of claim 15, further comprising:

a voltage input terminal configured to receive an input voltage; and a degenerate resistor configured to expand a linear voltage range of the voltage input.

* * * * *